Jan. 12, 1971 T. A. OSIAL ET AL 3,555,449

LIQUID COOLED LASER SYSTEM

Filed Nov. 15, 1966

INVENTORS
Kenneth B. Steinbruegge
and Thaddeus A. Osial
BY R. Lewis Gable
ATTORNEY United States Patent Office 3,555,449
Patented Jan. 12, 1971

3,555,449
LIQUID COOLED LASER SYSTEM
Thaddeus A. Osial, Penn Hills, and Kenneth B. Steinbruegge, Pittsburgh, Pa., assigors to Westinghouse Electric Corporation, Pittsburgh, Pa., a corporation of Pennsylvania
Filed Nov. 15, 1966, Ser. No. 594,548
Int. Cl. H01s 3/00
U.S. Cl. 331—94.5
11 Claims

ABSTRACT OF THE DISCLOSURE

This invention relates to mountings for laser systems commonly known as laser heads and in one illustrative embodiment includes a laser rod and a pump lamp which are disposed within an enclosure. The enclosure presents a reflective surface to the laser rod and the pump lamp and is substantially filled with a cooling medium to provide a radiation path between the laser rod and the pump lamp free from optical reflections or refractions.

---

This invention relates to devices for generating beams of coherent radiation typically called lasers or laser systems. More particularly, this invention relates to structures for assembling and supporting the components of a laser system.

Typically, the supporting structure for a laser system not only physically supports the laser rod but also provides for the mounting of a radiation source or lamp which provides radiation for exciting or pumping the laser rod. Further, the support structure provides suitable reflective surfaces whereby the pumping radiation from the lamp may be concentrated or focused upon the laser rod. In addition, suitable cooling for both the laser rod and the lamp may be provided by the support structure.

Laser systems capable of generating high average levels of powers are currently in demand for such applications as welding, machining and optical ranging. In particular, the laser system is well suited for material removal or machining in that beams of coherent radiation generated by such systems are capable of being precisely focused and achieve energy densities that exceed the power requirements necessary to vaporize any known material. However, in order to provide a commercially attractive laser system, high repetition rates must be achieved to reduce the operating times. Further, the use of a laser system is desirable where it is necessary to apply localized heating to thereby prevent mechanical deformation of the workpiece or where a very clean source of heating is required to prevent contamination. As mentioned above, the laser beam being optical radiation can be focused into a beam of small diameter and may also be used in special inert atmosphere, air, or in a vacuum. Before many potential laser welding applications can be realized, laser systems must be developed that can produce high average power densities for extended periods of time. In the area of optical ranging, the laser system is capable of providing extremely accurate measurements over long distances. Such applications for optical ranging require high peak powers as well as high repetition rates. Laser assemblies capable of generating beams of high peak power are needed so that information can be conveyed over long distances with higher accuracy, and high repetition rates are needed so that a target or a field of view may be rapidly scanned.

The problem of maintaining high average or peak powers from a laser system is primarily that of heat removal during the laser operation. It has been estimated that in the present state of the art, laser systems are only 5% efficient with the result that the remaining energy is converted into heat which must be removed for high average power operation. More specifically, the problem of cooling can be subdivided into four main areas:

(1) Cooling the laser rod or material;
(2) Preventing undesired radiation from the source of radiation or lamp from being transferred to the laser rod;
(3) Cooling the source of radiation or lamp; and
(4) Cooling the optical coupling cavity in which the radiation is directed from the lamp onto the laser rod.

The laser rod must be maintained at a reasonably constant temperature for several reasons. Laser rods made of such materials such as ruby will become extremely inefficient at temperatures approximately 50° C. above room temperature. If the temperature and thus the efficiency of the laser rod were allowed to fluctuate, the output from the laser system would likewise vary and erratic results would be obtained. Excessive heating of the laser rod can result in a shortening of the life of the dielectric or metallic mirrors that are frequently deposited on the ends of the laser rods. Similarly, heating can distort the physical form of the laser rod so as to disturb the mirror alignment, which would result in a marked decrease in efficiency.

Further, the life of the source of radiation or lamp is a function of its operating characteristics, and in particular of its temperature. If the lamps are operated at excessive power levels or temperatures, the electrodes will vaporize and coat the walls of the lamp, thereby reducing the lamp efficiency and the useful lamp life. Further, it may be understood that if radiation of undesired wavelengths are directed upon the laser rod, that the laser rod may be unduly heated without achieving the desired excitation of the laser rod. More specifically, only certain wavelengths of radiation serve efficiently to excite the laser rod whereas the remaining wavelengths of radiation only serve to provide undesired heating. It is also desired to cool the volume about and between the laser rod and the lamp to thereby more efficiently extract heat from the laser rod and the lamp.

At present, high average power lasers are cooled by one of the following cooling systems:

(1) Cooling the lamp, the laser rod and the coupling cavity with a forced air flow;
(2) Cooling the lamp and the laser rod with heat sinks which are attached thereto and purging the coupling cavity with a flow of air;
(3) Cooling the lamp and the coupling cavity with a flow of air and circulating a cooling liquid about the laser rod;
(4) Cooling the laser rod and the coupling cavity with a flow of air and circulating a liquid cooling medium about the lamp; and
(5) Enclosing the laser rod and lamp in separate enclosures and cooling each with a liquid cooling medium while purging the coupling cavity with air.

Forcing a flow of air through the coupling cavity is an adequate cooling system only when low repetition rates are required. The heat conductivity and heat capacity of air are too low to remove heat from the laser rod at a rate that would allow it to operate efficiently at higher power outputs. Further, flash lamps often radiate intense radiation of ultraviolet wavelengths which have a deleterious effect on laser rods made of such materials as neodymium. Systems depending on heat sinks disposed at the ends of the laser rods for cooling have serious drawbacks because of the presence of large temperature gradients along the length of the rods which can decrease efficiency.

Water cooling the laser rod and/or the flash lamp improves the component life and the average power output of such a system. However, the use of separate enclosures results in low efficiencies due to the reflections, the refractions of the interfaces presented by the enclosures between the pumping lamp and the laser rod. More specifically, the reflections and refractions at the air-glass, water-glass interfaces all tend to reduce the coupling efficiency of such systems. Separate liquid cooling of the flash lamp and the laser rod increases the power handling capabilities of the laser system, but once again the interfaces presented by the jackets or enclosures for conducting the cooling medium present interfaces which reduce the coupling efficiency between the pumping lamp and the laser rod. Further, because of the physical size of the enclosures disposed about the pumping lamp and the laser rod, the spacing between the pumping lamp and the laser rod may no longer be optimized and a larger, less efficient spacing between the pumping lamp and the laser rod may be required.

It is accordingly an object of the present invention to provide a new and novel apparatus for efficiently extracting heat from a laser rod and the pumping lamp associated therewith.

It is a further object of this invention to provide a new and novel apparatus for more efficiently coupling the radiation generated by the pumping lamp to the laser rod.

It is a more specific object of this invention to provide a new and novel system in which the presence of an enclosure about the pumping lamp and/or the laser rod is avoided to thereby eliminate the reflections and refractions presented by the interfaces of these enclosures and to allow the optimizing of the distance between the laser rod and the pumping lamp.

It is a specific object of this invention to provide a new and novel apparatus for cooling a laser rod and a pumping lamp in which a reflective surface is provided that is in a thermally conductive relation with but physically isolated from the cooling medium.

It is a further object of this invention to provide a new and novel apparatus for cooling a laser rod and pumping lamp associated therewith which is capable of achieving high repetition rates and operating at high output rates.

These and other objects are accomplished in accordance with the teachings of the present invention by providing a new and improved apparatus for cooling a laser rod and a pumping lamp associated therewith. More specifically, the improved apparatus includes an enclosure or housing disposed about both the laser rod and the pumping lamp and to be substantially filled with a suitable cooling medium. Further, the jacket provides a suitable reflective surface which may be efficiently cooled by the cooling medium and which is exposed to the lamp and the laser rod to thereby reflect more efficiently the pumping radiation onto the laser rod. In one particular embodiment of this invention, the reflecting surface may be disposed upon the exterior of the enclosure to thereby be physically isolated from the cooling medium and to thereby prevent contamination of the cooling medium while protecting the reflector surface from possible deterioration. It is a significant aspect of this invention that the cooling medium substantially fills the volume within the enclosure and between the laser rod and the pumping lamp so that there are no interfaces such as provided by additional enclosures between the pumping lamp and the laser rod.

These and other objects and advantages of the present invention will become more apparent when considered in view of the following detailed description and drawings, in which.

Figure 1:
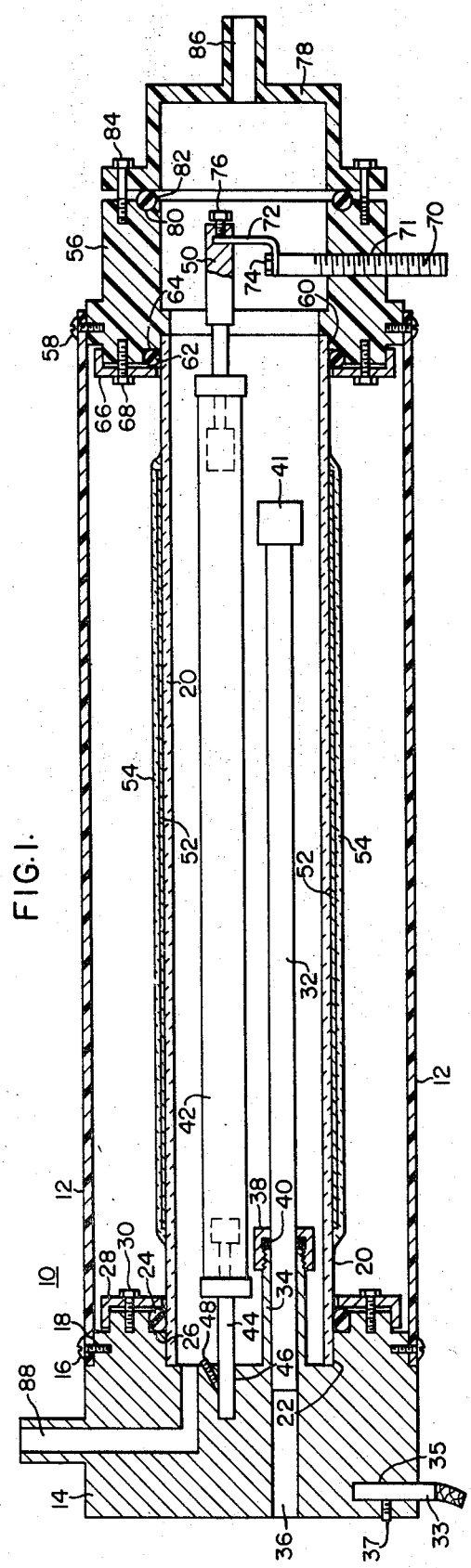
FIG. 1 shows a sectional view of an apparatus for mounting a laser rod and a pumping lamp in accordance with the teachings of this invention.

Referring now to the drawings and in particular to FIG. 1, there is shown an illustrative embodiment of a laser support housing 10 commonly known as a laser head and including an outer cylindrical enclosure 12 disposed about a laser rod 32 and a lamp 42 for generating radiation to excite the laser rod 32. The outer cylindrical enclosure 12 is secured at one end to a terminal base 14; in particular, the outer enclosure 12 is recessed in an offset portion 18 and is secured to the base 14 with suitable fasteners 16. The other end of the jacket 12 is secured to a terminal support member 56 of cylindrical configuration as by fasteners 58.

In accordance with one aspect of this invention, an inner cylindrical enclosure 20 made of a suitable insulating material such as glass is disposed within the outer enclosure 12 and about the laser rod 32 and the lamp 42. One end of the inner enclosure 20 is disposed within a depressed portion 22 of the terminal base 14. An inlet conduit 88 is provided through the terminal base 14 and into the pumping cavity as defined by the inner cylindrical enclosure 20. As will be explained in detail later, a cooling medium is circulated through the inner enclosure 20 to withdraw heat from the laser rod 32 and the lamp 42. In order to insure a liquid tight seal between the terminal base 14 and the inner enclosure 20, an O-ring 24 is disposed within an annular slot 26 of the base 14. Further, an annular retaining member 28 is disposed about the inner enclosure 20 and is forced toward the base 14 as by a plurality of fasteners 30 so as to compress the O-ring 24 against the exterior periphery of the inner enclosure 20 and to form an effective water-tight seal therebetween.

In a similar manner, the other open end of the inner enclosure 20 is connected with the terminal support member 56. More specifically, the other end of the inner enclosure 20 is disposed within a depressed portion 60 of the support member 56. A liquid tight seal is formed between the inner enclosure 20 and the member 56 by an O-ring 62 which is disposed within an annular slot 64 formed within the member 56. An annular retaining member 66 is disposed about the inner enclosure 20 and is forced toward the member 56 by a plurality of fasteners 68 to thereby compress the O-ring 62 against the exterior periphery of the inner enclosure 20 and to form an effective seal therebetween. Further, an end cap 78 is secured to the terminal support member 56 by a plurality of fasteners 84. A liquid tight seal is formed by an O-ring 82 which is disposed within an annular slot 80. The fasteners 84 are secured to the support member 56 to compress the O-ring 82 between the end cap 78 and the support member 56 to thereby form a seal therebetween. An outlet 86 is provided through the end cap 78 to allow the cooling medium which is introduced through the inlet 88 and passes through the inner enclosure 20 to escape from the support housing 10.

The laser rod 32 is supported within the housing 10 by a cylindrical support member 34. More specifically, the laser rod 32 is inserted in a tight fit relation within an aperture 36, which extends through the terminal base 14 and which provides a path along which the beam of coherent radiation generated by the laser rod 32 may be directed. A liquid tight seal is formed between the laser rod 32 and the base 14 by an O-ring 40 which is disposed about the laser rod 32 and compressed thereagainst by a threaded cap 38 fastened to the support member 34. Another liquid tight seal is formed by a cap 41 which is disposed about the other end of the laser rod 32 and serves to compress an O-ring (not shown) against the periphery of the laser rod 32.

In order to support the lamp 42 within the laser support housing 10, the lamp 42 has a terminal 44 projecting from one end which is inserted in an opening 46 within the terminal base 14. A set screw 48 is provided to firmly fasten and secure the terminal 44 to the base 14. Further, the lamp 42 has a terminal 50 extending from the other end of the lamp 42 which is connected to a terminal member 70. The terminal member 70 is threaded and is disposed in a liquid tight relation within a threaded aperture 71 provided through the terminal member 56. An electrical lead 72 is electrically secured to the terminal member 70 by a fastener 74. The other end of the electrical lead 72 is inserted in an aperture within the terminal 50 and is secured thereto by a set screw 76.

In order to make an electrical connection to the terminal base 14, an opening 35 is formed within the base 14 to receive a terminal member 33 in a tight fit relation. In order to secure the terminal member 33, a set screw 37 is provided to place a retaining force against the terminal member 33.

It is a significant aspect of this invention that a layer 52 of a suitable, highly reflective material such as gold, silver or aluminum be applied as by vacuum deposition to the exterior surface of the cylindrical inner enclosure 20. The layer 52 serves to reflect and to focus the light generated by the lamp 42 onto the laser rod 32 to thereby more efficiently excite the laser rod 32. It is particularly noted that the cooling medium passing through the inner enclosure 20 does not come in contact with the layer 52 deposited on the exterior periphery of the inner enclosure 20 thereby eliminating possible contamination and thus deterioration of the layer 52. Further, the layer 52 is suitably cooled as by conduction through the relatively thin thickness of the inner enclosure 20. In order to protect the coating 52 of highly reflective material, a second coating 54 of a protective material such as Pyrex (a trademark of Corning for a glass containing approximately 80.8% $SiO_3$, 12% $B_2O_3$, 2.3% $Al_2O_3$ with remaining portions of CaO, $Na_2O$, $K_2O$ and $Ag_2O_3$) or quartz may be deposited over the layer 52. Primarily, the protective coating 54 is designed to prevent any damage to the layer 52 of high reflective material due to handling during the process of assembling the housing 10. The layer 52 extends along a length of the inner enclosure 20 corresponding substantially to the spacing between the electrodes 44 and 50 across which a discharge is maintained and along which light is generated. The coating 52 would not extend along the entire length of the inner enclosure 20 and thereby prevents an electrical path being formed between the terminal 70 and the terminal 33.

Figure 2:
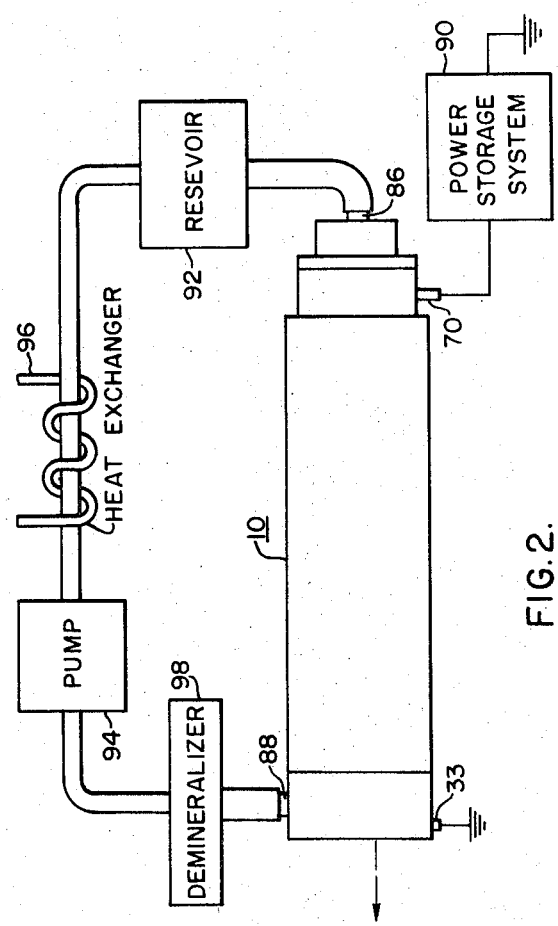
FIG. 2 shows a diagrammatic form of a system for pumping a cooling medium through the apparatus shown in FIG. 1.

Referring now to FIG. 2, there is shown a system in which the laser support housing 10 may be incorporated. In particular, the system includes a power and storage system 90 for repetitively applying a suitable high potential across the terminals 70 and 33. As a result, the potential from the system 90 is applied across the terminals 50 and 44 of the radiation pumping lamp 42 to thereby generate an intense radiation which is reflected and focused onto the laser rod 32. As is well understood in the art, the laser rod 32 is thereby excited; when the atomic particles of the laser rod return to a relaxed state, a coherent beam of radiation is generated along the length thereof to pass from the housing 10 through the aperture 36. It may be understood that approximately 95% of the energy supplied to the laser rod 32 is dissipated primarily in the form of heat and that it is necessary for the efficiency of the operation of this device at high average power levels to remove the excess thermal energy. In order to remove heat, a suitable cooling medium such as water is directed as by a pump 94 into the inlet 88 and through the coupling cavity formed by the inner enclosure 20 to be discharged through the outlet 86. The cooling medium circulates through a reservoir 92 and a heat exchanger 96 which could be of the refrigeration type to thereby remove the thermal energy from the cooling medium. In one particular embodiment of this invention, the pump 94 was of such capacity to force the cooling medium through the housing at a rate of approximately 1 gallon per minute while approximately 300 watts of electrical energy were supplied by the system 90 to the lamp 42. In order to insure that such a cooling medium such as water retains its insulative characteristic and that an electrical discharge is prevented through the cooling medium between electrodes 46 and 50, a demineralizer 98 is disposed within the circulating system between the pump 94 and the inlet 88. In one particular embodiment of this invention, the demineralizer 98 incorporated in this system was a mixed resin, nuclear grade demineralizer, No. 8402 as manufactured by the Barnsted Still and Sterilizer Co. It is noted that greater heat absorbing capacity could be achieved with the use of a cooling medium such as a silicone liquid.

With regard to the specific embodiment shown in FIG. 1, the outer cylindrical jacket 12 may be formed of a suitable insulating material such as Micarta (a trademark of Westinghouse for a thermosetting plastic made of a fabric impregnated with phenol formaldehyde resins) in order to prevent an electrical discharge therethrough between the terminal 70 and the base 14. Further, since a high potential is applied to the terminal member 70, the cylindrical terminal support member 56 is made of a suitable insulating material such as nylon or Teflon (a trademark of Du Pont for a tetrafluoroethylene polymer). It is noted that both nylon and Teflon are highly resistant to corrosion and therefore would not contaminate the cooling medium passing through the housing. Further, both of these materials are easy to machine. The terminal base 14 which is illustratively disposed at ground potential could be made of a suitable electrically conductive material such as stainless steel 303, which metal is noncorrosive and would not contaminate the cooling medium flowing through the inlet 88.

As mentioned above, the pumping lamp 42 may generate intense radiation having wavelengths of ultraviolet light which have a tendency to decrease the efficiency of lasers made of such materials as neodymium. Though the physical phenomenon is not completely understood, it has been found that ultraviolet radiation has a tendency to decrease the efficiency of neodymium doped laser rods by a factor of approximately 2 or 3 and also to cause physical damage to the laser rod 32. Thus where the use of neodymium doped laser rods is desirable, a cooling medium such as water is effective to filter out the undesired ultraviolet radiation as well as to cool the laser rod 32 and the lamp 42. In order to further reduce the intensity of ultraviolet radiation, the layer 52 of reflective material may be made of silver and deposited to a depth of 500 to 800 angstroms. As a result, a substantial part of the undesired ultraviolet radiation will be transmitted through the layer 52 and will not be reflected back onto the laser rod 32. Further, the material of which the inner enclosure 20 is made may act as a filter to undesired wavelengths of radiation. In the instance where it is desired to filter out ultraviolet radiation, the inner jacket 20 may be made of a suitable glass such as Nonex (a trademark of the Corning Glass Corporation for a glass including $SiO_2$, $B_2O_3$, PbO, CaO and $Na_2O$). Measurements have been conducted upon one particular embodiment of this invention in which a neodymium doped laser rod having a length of 12 inches and a diameter of ½ inch was incorporated; such a system achieved an efficiency of approximately 3% whereas systems incorporating a prior art laser rod of these dimensions and material has achieved an efficiency of only approximately 1%. It is noted that the efficiencies of laser systems depends to a certain degree upon the length of the laser rod; however, efficiencies of systems incorporating the teachings of this invention have been increased as compared with systems incorporating prior art laser rods of the same dimensions.

Figure 3:
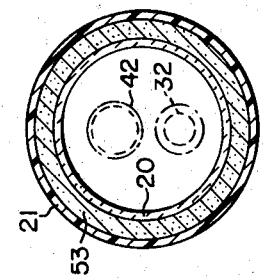
FIG. 3 is a sectional view of another embodiment of the mounting apparatus of this invention.

In another significant embodiment of this invention shown in FIG. 3, a diffused reflector may be formed by a reflective, powdery material 53 such as MgO or $MgCO_3$ which is packed between the inner enclosure 20 and a second, cylindrical enclosure 21 having a slightly greater diameter and made of suitable glass or plastic material. The packed powders of reflective material present a diffuse reflective surface to the pumping lamp 42 so that the radiation is substantially uniformly incident onto the laser rod 32. Tests have shown that a laser rod is more uniformly pumped in a coupling cavity having a diffuse deflector as described above resulting in laser beams of more uniform intensity in cross section and having minimal beam divergence. Further, the life of the reflective surface is extended. Powders of such materials as MgO and $MgCO_3$ are extremely stable and are not subject to scratching or oxidation as are thin metallic films.

Thus, there has been shown a laser support housing which is capable of efficiently extracting excess thermal energy from both the excitation lamp and the laser rod to thereby achieve greater efficiencies than that achieved by the prior art. This is primarily due to the improved optical coupling of the radiation between the laser rod and the lamp because of the elimination of any enclosure that would introduce defocusing reflections or refractions. Further, the life of the various components incorporated within this system may be extended due to the increased efficiency of cooling and due to the fact that the reflective layer 52 is isolated from the possible contamination of the cooling medium. The efficiency of this system is also increased due to the optimization of the placement of the rod and the lamp at the correct spacing and due to the use of the cooling medium. Further, the inner enclosure may be made of a material having a filtering characteristic to eliminate undesired radiation generated by the lamp which may have a deleterious effect upon the laser rod by introducing undesired thermal energy. Thus, the apparatus in accordance with the teachings of this invention is capable of operating at high peak or average powers and at high repetition rates.

Since numerous changes may be made in the above-described apparatus and different embodiments of the invention may be made without departing from the spirit thereof, it is intended that all matter contained in the foregoing description and as shown in the accompanying drawings, shall be interpreted as illustrative and not in a limiting sense.

We claim as our invention:

1. An apparatus for cooling both a first means for generating a beam of coherent radiation and a second means for providing pumping radiation to excite said first means, said apparatus comprising an enclosure having a cavity into which said first means and second means are disposed, and an insulative cooling liquid for simultaneously dissipating heat from said first and second means, said enclosure providing a surface reflective to said pumping radiation on the exterior surface of said enclosure, said liquid substantially filling said cavity to provide the sole medium between said first and second means.

2. A system including said apparatus as claimed in claim 1, in which said cooling liquid is water and said system further including third means for directing said cooling liquid through said cavity, fourth means for extracting thermal energy from said cooling liquid, and fifth means for dimineralizing said cooling liquid, said third, fourth and fifth means being connected by conduits with said cavity.

3. An apparatus for cooling both a first means for generating a beam of coherent radiation and a second means for providing pumping radiation to excite said first means, said apparatus comprising an enclosure having a cavity into which said first means and said second means are disposed, and a cooling liquid having the characteristic of being nontransmissive to those wavelengths of said radiation which fail to pump said first means while simultaneously dissipating heat from said first and second means, said enclosure providing a surface reflective to said pumping radiation, said liquid substantially filling said cavity to provide the sole medium between said first and second means, said enclosure being substantially transmissive to those wavelengths of said radiation from second means which fail to pump said first means.

4. An apparatus as claimed in claim 11, wherein said powdered material is MgO.

5. The apparatus in claim 1 wherein said cooling liquid cools said enclosure and said reflective surface by physically contacting the interior surface of said enclosure.

6. An apparatus for cooling both a first means for generating a beam of coherent radiation and a second means for providing pumping radiation to excite said first means, said apparatus comprising an enclosure having a cavity into which said first means and said second means are disposed, said enclosure of a material substantially transmissive to those wavelengths of said radiation which pump said first means, said enclosure having a reflective surface disposed on the exterior periphery of said enclosure, and a cooling liquid for simultaneously dissipating heat from said first and second means, said liquid substantially filling said cavity to provide the sole medium between said first and second means.

7. An apparatus for cooling both a first means for generating a beam of coherent radiation and a second means for providing pumping radiation to excite said first means, said apparatus comprising an enclosure having a cavity into which said first means and second means are disposed, and a cooling liquid for simultaneously dissipating heat from said first and second means, said enclosure having a diffused reflective surface to said pumping radiation, said liquid substantially filling said cavity to provide the sole medium between said first and second means.

8. An apparatus for cooling both a first means for generating a beam of coherent radiation and a second means for providing pumping radiation to excite said first means, said apparatus comprising an enclosure having a pump cavity into which said first and second means are disposed, said enclosure of material exhibiting the property of filtering out undesired wavelengths of radiation in the ultraviolet region, a cooling liquid for dissipating heat from said first and second means, said enclosure providing a diffused surface on the exterior surface of said enclosure and reflective to desired wavelengths of said pumping radiation.

9. An apparatus for cooling both a first means for generating a beam of coherent radiation and a second means for providing pumping radiation to excite said first means, said apparatus comprising an enclosure having a cavity into which said first and second means are disposed, said enclosure of material substantially transmissive to those wavelengths of said radiation which pump said first means, said enclosure having a reflective surface disposed on the exterior periphery of said enclosure, said reflective surface having the property of being substantially transmissive to those wavelengths of said pumping radiation which fail to pump said first means, and a cooling liquid for simultaneously dissipating heat from said first and second means, said liquid substantially filling said cavity to provide the sole medium between said first and second means.

10. An apparatus for cooling both a first means for generating a beam of coherent radiation and a second means for providing pumping radiation to excite said first means, said first means including a neodymium doped laser rod, said apparatus comprising an enclosure having a cavity into which said first and second means are disposed, said enclosure of material substantially transmissive to those wavelengths of said radiation which pump said first means, said enclosure having a reflective surface disposed on the exterior periphery of said enclosure, said reflective surface including a layer of silver deposited to a thickness of approximately 500 to 800 angstroms upon said enclosure, and a cooling liquid for simultaneously dissipating heat from said first and second means, said liquid substantially filling said cavity to provide the sole medium between said first and second means.

11. An apparatus for cooling both a first means for generating a beam of coherent radiation and a second means for providing pumping radiation to excite said first means, said apparatus comprising an enclosure having a cavity into which said first and second means are disposed, and a cooling liquid for simultaneously dissipating heat from said first and second means, said enclosure having a diffused reflective surface to said pumping radiation, said diffused reflective surface comprised of a powdered material disposed between said first enclosure and a second enclosure disposed about said first enclosure, said liquid substantially filling said cavity to provide the sole medium between said first and second means.

References Cited

UNITED STATES PATENTS

| | | | |
|---|---|---|---|
| 3,210,687 | 10/1965 | Boyd et al. | 331—94.5 |
| 3,223,944 | 12/1965 | Luck Jr. et al. | 331—94.5 |
| 3,356,966 | 12/1967 | Miller | 331—94.5 |
| 3,102,920 | 9/1963 | Sirons | 331—94.5 |

FOREIGN PATENTS

| | | | |
|---|---|---|---|
| 1,162,479 | 2/1964 | Germany | 21F—90 |

RONALD L. WIBERT, Primary Examiner

P. K. GOODWIN, Assistant Examiner